(12) United States Patent
Qiu

(10) Patent No.: US 10,657,192 B2
(45) Date of Patent: *May 19, 2020

(54) SYSTEMS AND METHODS FOR SELECTING CONTENT BASED ON LINKED DEVICES

(71) Applicant: Google Inc., Mountain View, CA (US)

(72) Inventor: Jianjun Qiu, Chicago, IL (US)

(73) Assignee: Google LLC, Mountain View, CA (US)

( * ) Notice: Subject to any disclaimer, the term of this patent is extended or adjusted under 35 U.S.C. 154(b) by 495 days.

This patent is subject to a terminal disclaimer.

(21) Appl. No.: 15/422,288

(22) Filed: Feb. 1, 2017

(65) Prior Publication Data
US 2017/0147937 A1 May 25, 2017

Related U.S. Application Data

(63) Continuation of application No. 14/806,268, filed on Jul. 22, 2015, now Pat. No. 10,068,027.

(51) Int. Cl.
G06F 16/00 (2019.01)
G06F 16/955 (2019.01)
(Continued)

(52) U.S. Cl.
CPC .............. G06F 16/955 (2019.01); G06F 3/16 (2013.01); G06F 16/211 (2019.01); G06F 16/22 (2019.01);
(Continued)

(58) Field of Classification Search
CPC .. G06F 16/955; G06F 16/22; G06F 16/24578; G06F 16/211; G06F 16/29;
(Continued)

(56) References Cited

U.S. PATENT DOCUMENTS 6,876,755 B1 4/2005 Taylor et al.
7,668,954 B1 2/2010 Melvin
(Continued)

FOREIGN PATENT DOCUMENTS

CN 103635925 3/2014
JP A2012-085115 4/2012
(Continued)

OTHER PUBLICATIONS

Drawbridge Cross-Device Consumer Graph, Apr. 14, 2014.
(Continued)

Primary Examiner — Anh Ly
(74) Attorney, Agent, or Firm — Foley & Lardner LLP

(57) ABSTRACT

The present disclosure is directed to associating computing devices with each other based on computer network activity for selection of content items as part of an online content item placement campaign. A first linking factor is identified based on a connection between a first device and the computer network via a first IP address during a first time period, and based on a connection between a second device and the computer network via the first IP address during the first time period. A number of devices that connect with the computer network via the first IP address is determined. A positive match probability is generated. A second and third linking factors are monitored. A negative match probability is determined based on the second and third linking factors. The first device is linked with the second device based on the positive and negative match probabilities.

20 Claims, 5 Drawing Sheets

(51) Int. Cl.

| | |
|---|---|
| *G06N 20/00* | (2019.01) |
| *G06F 16/22* | (2019.01) |
| *G06F 16/29* | (2019.01) |
| *G06F 16/21* | (2019.01) |
| *G06F 16/951* | (2019.01) |
| *G06F 16/2457* | (2019.01) |
| *G06Q 10/10* | (2012.01) |
| *G06Q 30/02* | (2012.01) |
| *H04L 29/08* | (2006.01) |
| *G06F 3/16* | (2006.01) |

(52) U.S. Cl.
CPC ........ *G06F 16/24578* (2019.01); *G06F 16/29* (2019.01); *G06F 16/951* (2019.01); *G06N 20/00* (2019.01); *G06Q 10/10* (2013.01); *G06Q 30/0254* (2013.01); *G06Q 30/0256* (2013.01); *G06Q 30/0261* (2013.01); *G06Q 30/0269* (2013.01); *G06Q 30/0277* (2013.01); *H04L 67/02* (2013.01); *H04L 67/04* (2013.01); *H04L 67/10* (2013.01); *H04L 67/12* (2013.01); *H04L 67/125* (2013.01); *H04L 67/14* (2013.01); *H04L 67/18* (2013.01); *H04L 67/22* (2013.01)

(58) Field of Classification Search
CPC ........ G06F 16/951; G06F 16/00; G06F 17/30; G06F 3/162; G06F 17/30241; G06F 16/1844; G06F 16/27; G06F 16/4387; G06F 16/41; G06F 16/44; G06F 16/275; G06F 11/1451; G06N 7/005; G06N 20/00; G06N 99/005; G06Q 30/0277; H04L 67/18

See application file for complete search history.

(56) References Cited

U.S. PATENT DOCUMENTS

| | | | |
|---|---|---|---|
| 7,840,927 B1 | 11/2010 | Dozier et al. | |
| 8,695,032 B2 | 4/2014 | Shkedi | |
| 2002/0042681 A1 | 4/2002 | Califano et al. | |
| 2002/0199110 A1* | 12/2002 | Kean .................. | G06F 17/5054 713/189 |
| 2003/0028522 A1 | 2/2003 | Collins-Thompson et al. | |
| 2003/0095524 A1 | 5/2003 | Stephens et al. | |
| 2005/0256680 A1 | 11/2005 | Goodman | |
| 2006/0114846 A1 | 6/2006 | Dssouli et al. | |
| 2006/0265489 A1 | 11/2006 | Moore | |
| 2007/0022442 A1 | 1/2007 | Gil et al. | |
| 2007/0061487 A1 | 3/2007 | Moore et al. | |
| 2007/0083833 A1 | 4/2007 | Bothra | |
| 2007/0121596 A1 | 5/2007 | Kurapati et al. | |
| 2008/0005067 A1 | 1/2008 | Dumais et al. | |
| 2008/0109285 A1 | 5/2008 | Reuther et al. | |
| 2008/0147575 A1 | 6/2008 | Roy | |
| 2008/0172374 A1 | 7/2008 | Wolosin et al. | |
| 2008/0184349 A1 | 7/2008 | Ting | |
| 2008/0288348 A1 | 11/2008 | Zeng et al. | |
| 2009/0210369 A1* | 8/2009 | Shao .................... | G06F 16/951 706/21 |
| 2009/0295918 A1 | 12/2009 | Horovitz et al. | |
| 2009/0297037 A1 | 12/2009 | Pele et al. | |
| 2011/0119572 A1 | 5/2011 | Jang et al. | |
| 2011/0243449 A1* | 10/2011 | Hannuksela ....... | G06K 9/00221 382/190 |
| 2012/0278028 A1 | 11/2012 | David et al. | |
| 2013/0073336 A1 | 3/2013 | Heath | |
| 2013/0074115 A1 | 3/2013 | Hyde et al. | |
| 2013/0097664 A1 | 4/2013 | Herz et al. | |
| 2013/0104251 A1 | 4/2013 | Moore et al. | |
| 2013/0124309 A1 | 5/2013 | Traasdahl et al. | |
| 2013/0124333 A1 | 5/2013 | Doughty et al. | |
| 2013/0132484 A1* | 5/2013 | Berezecki .............. | G06Q 10/06 709/205 |
| 2013/0155422 A1 | 6/2013 | Kuo et al. | |
| 2013/0157729 A1* | 6/2013 | Tabe ................ | H04W 52/0245 455/573 |
| 2013/0167196 A1 | 6/2013 | Spencer et al. | |
| 2013/0315885 A1 | 11/2013 | Narain et al. | |
| 2014/0052527 A1 | 2/2014 | Roundtree | |
| 2014/0095320 A1 | 4/2014 | Sivaramakrishnan | |
| 2014/0122703 A1 | 5/2014 | Pugh et al. | |
| 2014/0173037 A1 | 6/2014 | Beddow et al. | |
| 2014/0201126 A1 | 7/2014 | Zadeh et al. | |
| 2014/0222436 A1 | 8/2014 | Binder et al. | |
| 2014/0278944 A1 | 9/2014 | Kash et al. | |
| 2014/0278992 A1 | 9/2014 | Roundtree et al. | |
| 2014/0279304 A1 | 9/2014 | Lall | |
| 2014/0344695 A1 | 11/2014 | Lawandus et al. | |
| 2014/0358523 A1 | 12/2014 | Sheth et al. | |
| 2015/0113024 A1 | 4/2015 | Howe | |
| 2015/0193122 A1 | 7/2015 | Liu et al. | |
| 2015/0286383 A1 | 10/2015 | D'Aloisio et al. | |
| 2016/0142275 A1 | 5/2016 | Hendry et al. | |
| 2016/0328604 A1 | 11/2016 | Bulzacki | |
| 2016/0379233 A1 | 12/2016 | Besehanic et al. | |
| 2017/0024484 A1* | 1/2017 | Qiu ......................... | G06F 3/16 |
| 2017/0244608 A1 | 8/2017 | Reaux-Savonte | |

FOREIGN PATENT DOCUMENTS

| | | |
|---|---|---|
| JP | 2015-079471 | 4/2015 |
| JP | A2015-103044 | 6/2015 |
| WO | WO-2014/203001 | 12/2014 |

OTHER PUBLICATIONS

Forrester The New Path-to-Purchase, Jul. 2014.
TAPAD Measuring Cross-Device.
The International Search Report and The Written Opinion of The International Searching Authority for PCT Application No. PCT/US2016/042053 dated Oct. 13, 2016 179 pages.
JP First Office Action dated Jan. 21, 2019 in Japanese Patent Application No. 2017-556905.
KR Office Action dated Jan. 22, 2019 in Korean Patent Application No. 10-2017-7031640.
EP Article 94(3) EPC Communication dated Feb. 27, 2019 in EP Patent Application No. 16741781.5.
U.S. Notice of Allowance on U.S. Appl. No. 14/806,268 dated May 10, 2018.
International Preliminary Report and Written Opinion of the International Searching Authority for Application No. PCT/US2016/042053 dated Feb. 1, 2018.
U.S. Office Action on U.S. Appl. No. 14/806,268 dated Nov. 29, 2017.
Bernstein, et al., "High-Density Laser Linking of Metal Interconnect," IEEE Transactions on Components, Packaging, and Manufacturing Technology: Part A vol. 17 Issue 4, dated Dec. 1994 (4 pages).
Notice of Allowance on U.S. Appl. No. 15/422,305 dated Oct. 30, 2019 (11 pages).
Non-Final Office Action for U.S. Appl. No. 15/422,305, dated Jul. 10, 2019 (15 pages).
Non-Final Office Action for U.S. Appl. No. 15/422,411 dated Jun. 26, 2019 (16 pages).
Notice of Allowance for U.S. Appl. No. 15/422,411 dated Feb. 20, 2020 (10 pages).
Notice of Allowance for U.S. Appl. No. 15/422,411 dated Nov. 27, 2019 (12 pages).
Foreign Action other than Search Report on CN 201680003811.4 dated Mar. 17, 2020.

* cited by examiner

SYSTEMS AND METHODS FOR SELECTING CONTENT BASED ON LINKED DEVICES

CROSS-REFERENCES TO RELATED APPLICATIONS

This application claims the benefit of priority under 35 U.S.C. § 120 as a continuation of U.S. patent application Ser. No. 14/806,268, filed Jul. 22, 2015, which is incorporated by reference herein in its entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

The present disclosure is generally directed to selecting content items based on linked computing devices. An entity may use multiple desktop or mobile devices to access a network, which may result in network activities of the entity being split across multiple devices. However, it may be challenging for a data processing system to select content for display on a device of the entity based on partial network activity only associated with the device. The systems and methods described herein can link two or more computing devices using an anonymous identifier. The systems and methods described herein can determine a probability that indicates whether the two devices are or should be linked together, and can generate the link when the probability satisfies a threshold.

At least one aspect is directed to a method of associating computing devices with each other based on computer network activity for selection of content items as part of an online content item placement campaign. The method can include a data processing system identifying a first linking factor based on a connection between a first computing device and the computer network via a first IP address during a first time period, and based on a connection between a second computing device and the computer network via the first IP address during the first time period. The method can include the data processing system determining a number of computing devices other than the first computing device that connect with the computer network via the first IP address during the first time period. The method can include the data processing system generating a positive match probability based on the first linking factor and based on the number of computing devices. The method can include the data processing system monitoring for a second linking factor based on input activity at the first computing device during a second time period, and based on input activity at the second computing device during the second time period. The method can include the data processing system monitoring for a third linking factor based on activity at the first computing device via the first IP address during a third time period, and based on activity at the second computing device via a second IP address during the third time period. The method can include the data processing system determining a negative match probability based on the second linking factor and based on the third linking factor. The method can include the data processing system linking the first computing device with the second computing device based on the positive match probability and the negative match probability. The method can include the data processing system creating a data structure to indicate a link between the first computing device and the second computing device.

At least one aspect is directed to a system for associating computing devices with each other based on computer network activity. The system can include a data processing system having one or more processors. The system can include a matching engine and a connector executed by the data processing system. The matching engine can identify a first linking factor based on a connection between a first computing device and the computer network via a first network node identifier during a first time period, and based on a connection between a second computing device and the computer network via the first network node identifier during the first time period. The matching engine can determine a number of computing devices other than the first computing device that connect with the computer network via the first network node identifier during the first time period. The matching engine can generate a positive match probability based on the first linking factor and based on the number of computing devices. The matching engine can monitor for a second linking factor based on input activity at the first computing device during a second time period, and based on input activity at the second computing device during the second time period. The matching engine can monitor for a third linking factor based on activity at the first computing device via the first network node identifier during a third time period, and based on activity at the second computing device via a second network node identifier during the third time period. The matching engine can determine a negative match probability based on the second linking factor and based on the third linking factor. The connector can link the first computing device with the second computing device based on the positive match probability and the negative match probability.

At least one aspect is directed to a method of associating computing devices with each other based on computer network activity. The method can include a data processing system identifying a first linking factor based on a connection between a first computing device and the computer network via a first network node identifier during a first time period, and based on a connection between a second computing device and the computer network via the first network node identifier during the first time period. The method can include the data processing system determining a number of computing devices other than the first computing device that connect with the computer network via the first network node identifier during the first time period. The method can include the data processing system monitoring for a second linking factor based on input activity at the first computing device during a second time period, and based on input activity at the second computing device during the second time period. The method can include the data processing system monitoring for a third linking factor based on activity at the first computing device via the first network node identifier during a third time period, and based on activity at the second computing device via a second network node identifier during the third time period. The method can include the data processing system linking the first computing device with the second computing device based on the first linking factor, the second linking factor, and the third linking factor.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
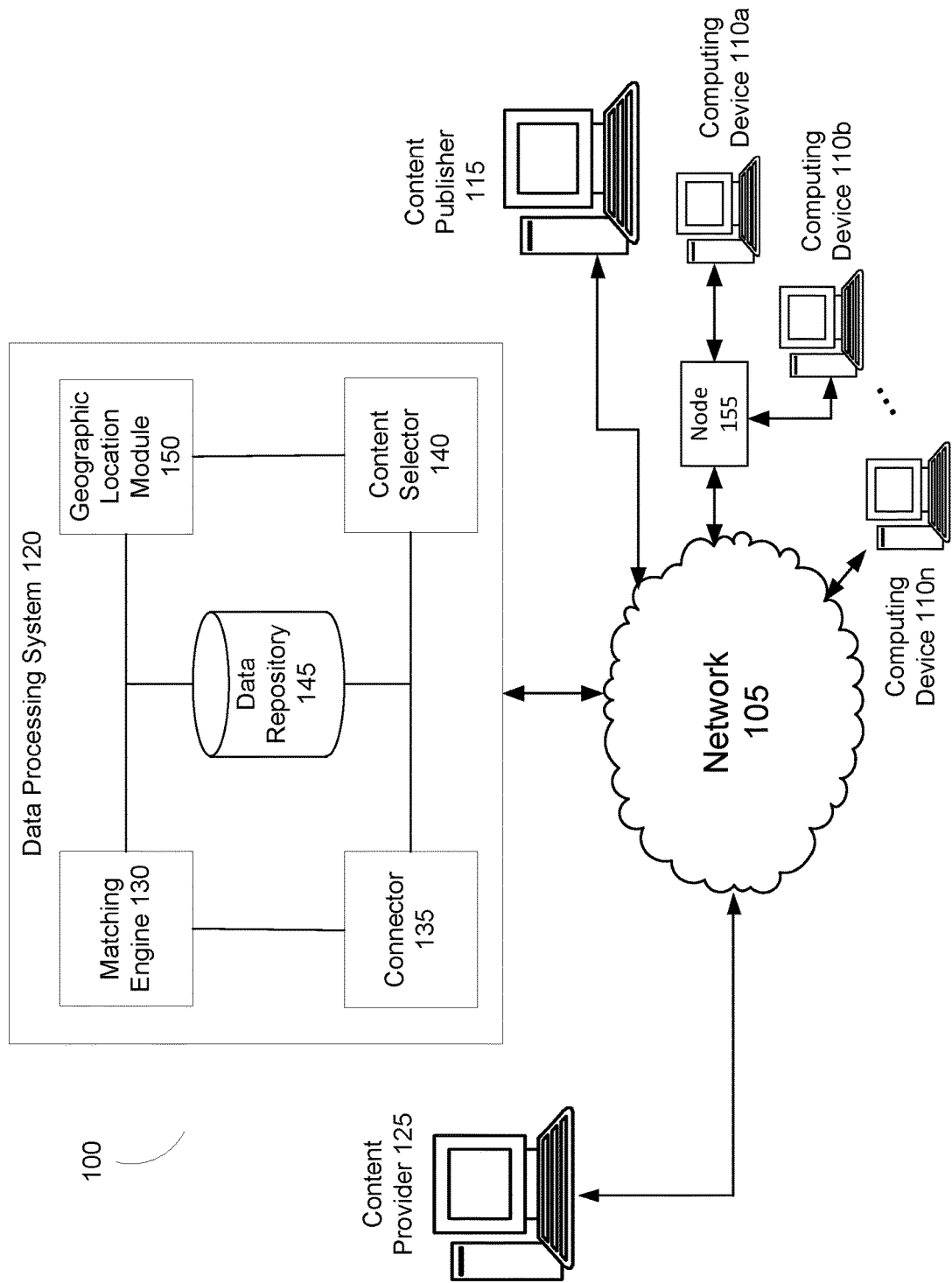
FIG. 1 depicts a system to select content based on linked computing devices via a computer network in accordance with an implementation.

Systems and methods described herein relate generally to selecting content (e.g., content items such as electronic documents or online electronic advertisements) based on a link between two or more computing devices. Entities may use multiple devices such as desktop or mobile devices to access a network, such as the Internet. For example, an entity may use a first desktop computer at a first work site, a second desktop computer at a second work site, a mobile phone, and a notebook. Thus, network activity for the entity may be split across multiple devices. When network activity is split across multiple devices, it may be challenging for a content selection computer system in a content selection computer network infrastructure to select content for display on the first desktop computer because the content selection system may have access to limited network activity information associated only with the first desktop computer, as opposed to network activity information associated with one or more of the second desktop computer, mobile phone, and notebook.

The systems and methods described herein can link multiple computing devices to each other based on anonymous IDs without using personally identifying information. The systems and methods described herein can include a data processing system that determines an overall match probability indicating a link or non-link between two computing devices, where a link can indicate a common owner, operator, user or other entity. The data processing system can determine the overall match probability between two computing devices based on a determination of a positive match probability, a negative match probability, and a weighting factor for each computing device.

The positive match probability can indicate the probability that two computing devices are linked by a common owner, operator, or user. For example, two computing devices suitable for linking may be in the same geographic location or share the same internet protocol ("IP") address at some point throughout the day. The same geographic location or the shared IP address can indicate that both computing devices are connected to a network such as the Internet from a common node; for example, such as in an office environment. When one of the computing devices is a mobile computing device such as a mobile phone, the data processing system can identify the mobile computing device as the single identifier for linked computing devices based, for example, on the assumption that the common owner, operator, or user will have just one mobile computing device. When the data processing system identifies more than one computing device at the IP address in addition to the mobile computing device, the data processing system can set the positive match probability to 100%/N, where N is the number of computing devices in addition to the mobile computing device that are identified at the IP address by the data processing system.

The negative match probability can indicate the probability that two computing device are not linked by a common owner, operator, or user. For example, two computing devices not suitable for linking may each exhibit activity while separated by a large physical distance, such as a number of miles. Such a separation can be identified or determined from the respective IP addresses of the two computing devices. Accordingly, the data processing system can increase the negative match probability between those two computing devices upon identification of simultaneous activity from the two computing devices when distant from each other.

In another example of negative match probability, two computing devices not suitable for linking may each exhibit simultaneous high-level activity. High-level activity can mean active input activities, as opposed to passive network connectivity or activity. For example, a single owner, operator, or user probably does not play video games on two computing devices simultaneously. A single owner, operator, or user could, however, stream video on one computing device while providing input to another via mouse, keyboard, or touchscreen. Such active input could be considered high-level activity, while the passive consumption of streaming video may not. Accordingly, the data processing system can increase the negative match probability between two computing devices upon identification of simultaneous high-level activity on those two computing devices as, in this example, it may be less likely that a common user would be actively providing input to multiple computing devices simultaneously.

The data processing system can determine an overall match probability between two computing devices based on the determination of the positive match probability, the negative match probability, and a weighting factor for each. The data processing system can determine a weight for the positive match probability and a weight for the negative match probability by training using determined links and determined non-links between computing devices. For example, the data processing system can determine the overall match probability based on a formula in the form of $1/(1+e^{-(wp*op+wn*on)})$, where wp=weight for positive match probability, wn=weight for negative match probability, op=positive match probability, on=negative match probability; * represents a multiplication or dot product or other mathematical combination. The data processing system can determine that two computing devices are linked when the overall match probability exceeds a threshold, or determine that two computing devices are not linked when the overall match probability falls below, or exceeds, the same or a different threshold.

FIG. 1 illustrates an example system 100 for selecting content based on linked computing devices via a computer network. The system 100 can include content selection infrastructure. The system 100 can include a data processing system 120 communicating with one or more of a content provider 125, content publisher 115 or computing devices 110a-n (also referred to as computing device 110) via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one content provider computing device 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one matching engine 130, at least one connector 135, at least one content selector 140, at least one geographic location module 150, and at least one data repository 145. The matching engine 130, connector 135 and content selector 140 can each include at least one processing unit or other logic device such as programmable logic array engine, or module configured to communicate with the database repository or database 145. The matching engine 130, connector 135, content selector 140, geographic location module 150, and data repository 145 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine 130 of the data processing system or other system. The input query may include text, characters, symbols, etc. The data processing system 120 may receive the input query from a computing device 110 via network 105. The input query may include audio (e.g., words spoken by a user of the computing device 110 and input into the search engine of the data processing system via network 105 and an interface). The request may include or be associated with information that facilitates selecting content responsive to the request. The information may include, e.g., contextual information about an electronic document, web page, electronic application, or organic, non-advertisement link on which the selected content is to be displayed. The data processing system 120 may provide an interface displaying input text boxes, buttons, drop downs, or other widgets through which a user of a client can select or otherwise indicate a category for the search.

Responsive to the search query or other request for content (e.g., electronic advertisements), the data processing system 120 (e.g., via content selector 140) can identify, select or otherwise obtain content to be provided or presented via the computing device 110 making the request, or some other computing device 110 associated with the request for content. In some implementations, the data processing system 120 may identify, select, or otherwise obtain content without receiving a request for content. The content may include, e.g., text, characters, symbols, images, video, audio, or multimedia content. The content item may include an advertisement in the form of a sponsored link (e.g., provided by content providers) included by the search engine (e.g., via content selector) for display in the search engine results page. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item and a second candidate content item) that are responsive to the request for content, or are otherwise candidates for display on an online document (e.g., a web page or a page of an online marketplace). The data processing system may initiate or utilize an online auction process to select one or more of the multiple content items for display on the online document. An auction system may determine two or more bids for content items to be displayed in an online document. The auction system can run the bids through an auction process to determine one or more winning bids. Content items corresponding to the winning bids or highest ranking bids may be selected for display on or with the online document.

The data processing system 120 may include a content selector 140. The content selector 140 may analyze, parse, or otherwise process subject matter of web page or the candidate content items to determine whether the subject matter of the candidate content items correspond to the web page. The content selector 140 may identify, analyze, or recognize terms, characters, text, symbols, or images of the web page or candidate content items using an image processing technique, character recognition technique, or database lookup. The candidate content items may include metadata indicative of the subject matter of the candidate content items, in which case the content selector 140 may process the metadata to determine whether the subject matter of the candidate content item corresponds to the web page.

Content providers may provide additional indicators when setting up a content campaign that includes content items. The content provider may provide information at the content campaign or content group level that the content selector 140 may identify by performing a lookup using information about the candidate content item. For example, the candidate content item may include a unique identifier, which may map to a content group, content campaign, or content provider. The content selector 140 may determine, based on information stored in data repository 145 about the content provider (e.g., advertiser), that the candidate content item is relevant or matches a request for a content item, subject matter provided via a web page with which the content item is to be displayed, or a search query input by a computing device.

The data processing system 120 may select the content using various techniques. For example, the data processing system 120 may select content from a referral or a lead from a partner content selection network. In some implementations, the content may not be selected using a keyword or matching technique, but be selecting based on a referral or a lead.

The content selector 140 may select the content item based on network activity information, browsing history information, profile information etc. associated with the computing device 110 that initiated the request for the content item or the computing device 110 that is to display the content item. The content selector 140 may identify a link between a first computing device 110 that is to display the content item and a second computing device 110, and use network activity information, browsing history, or other profile information associated with both the first computing device and the second computing device to select the content item for display. For example, the first computing device may have accessed a running blog web page, and the second computing device may have accessed a web page of an online retailer that sells a running shoe manufactured by Company_A. Using the link between the first computing device and the second computing device, the content selector may select a content item responsive a request from the first computing device and for display on the first computing device based on the network activity information or browsing history of the second computing device. For example, the content selector 140 can select an advertisement for the running shoe manufactured by Company_A for display on the first computing device even though the first computing device did not access the web page with the running shoe. Thus, the content selector 140 can, using the link, select a more relevant content item for display which may improve the content selector's ability to provide more relevant content items, thereby improving the content selection infrastructure, user experience, and content provider's advertisement metrics.

The data processing system 120 may include a matching engine 135 designed and constructed to determine whether to link two or more computing devices 110a-n. The matching engine 135 can be designed and constructed to identify a linking factor between at least two computing devices 110a-n, determine a positive match probability or a negative match probability, and generate a link between the at least two computing devices based on the positive and negative match probabilities. The link between the two computing device can be used to provision or select content items as part of an online content item placement campaign.

To generate the link between the two computing device, the matching engine 130 can identify a first linking factor. The matching engine 130 can identify the linking factor based on an internet protocol ("IP") address used by a first computing device 110a and a second computing device 110b to access the network 105 via a network connection. In some implementations, the matching engine 130 can identify the first linking factor based on an identifier (e.g., IP address, MAC address, WIFI address, TCP/IP header information such as source port, destination port) associated with a network node 155 (e.g., wireless or wired router, network gateway, firewall device, network switch, mobile hot spot, etc.) associated with the network connection.

The linking factor may refer to a factor that the matching engine 130 may use to determine a positive or negative match probability. The linking factor may be stored in a link data structure in data repository 145. The linking factor may include a binary value (e.g., 0 or 1, yes or no, positive or negative, flag or no flag), numeric score (e.g., 0 to 1, 1 to 10, 1 to 100) that indicates a level or degree of the linking factor, alphanumeric value, term, phrase, etc. For example, the matching engine 130 may determine the linking factor may be present (e.g., a 1, flag, "yes") based on a condition, rule, or event of the linking factor being satisfied. For example, the event, condition, trigger or rule of a linking factor may include or be based on one or more of: (1) identifying a connection between a first computing device 110a and the network 105 via a first IP address (or other identifier for the node 155) during a first time period and identifying a connection between a second computing device 110b and the network 105 via the first IP address during the first time period; (2) input activity at the first computing device 110a during a second time period and input activity at the second computing device 110b during the second time period; (3) activity at the first computing device 110a via the first IP address during a third time period and activity at the second computing device 110b via a second IP address during the third time period; (4) geographic distance between the first computing device 110a and the second computing device 110b and input activity at the first computing device 110a via the first IP address during a time period, and input activity at the second computing device 110b via the second IP address.

For example, the data processing system 120 may receive network activity information from a first computing device 110a. Network activity may include, e.g., a computing device 110a accessing a web page provided by the data processing system 120, the data processing system 120 receiving a request for content from the computing device 110a or for display on the computing device 110a, an application executing on the computing device 110a communicating, pinging, polling or otherwise accessing or interacting with the data processing system 120 for information. When the computing device 110a sends a request or otherwise connects or interacts with the data processing system 110, the interaction may include data packets that identify an electronic return address or the IP address for the connection. The network activity information may include information identify a node 155 or an IP address associated with the network activity information. For example, the data processing system 120 may receive network data packets that include a header with source IP information. In some implementations, the data processing system 120 may send a request to the computing device 110 to identify an IP address linked to the network activity.

The data processing system 120 may store node identifier (e.g., IP information) in memory or a link data structure. In some implementations, the data processing system 120 may not store this information. In some implementations, the data processing system 120 may store this information on a temporary basis (e.g., 1 hour, 30 minutes, 5 minutes, 60 seconds, 24 hours, etc.). The data processing system 120 can receive network activity information from a second computing device 110a, parse the network data packets (e.g., header information or payload information) to determine a second IP address associated with this network activity, and store this information in the link data structure or other database or data record. The data processing system 120 can perform a lookup in the link data structure using the IP address (or other node 155 identifier) to identify a number of computing devices that are connected or using network 105 via the IP address. In some implementations, the data processing system can compare the second IP address with the first IP address (or other node 155 identifier) to determine if the IP addresses match. Responsive to the IP addresses or other node 155 identifier associated with the network activity information from the two computing devices 110a-b matching, the data processing system 120 can identify a linking factor. In some implementations, the link data structure may store active network activity connections or include time stamps indicating when a network activity connection is active or inactive.

The data processing system 120 (e.g., via matching engine 130) may determine or identify a first time period during which the connection between the first computing device and the computer network via a first IP address is open. The matching engine 130 may further determine or identify a second time period during which the connection between the second computing device and the computer network via a first IP address is open. The matching engine 130 may determine the linking factor based on whether the first time period and the second time period are overlapping time periods. For example, the data processing system 120 can store timestamps for a network activity session associated with the first computing device and the second computing device. The timestamp can indicate a start and stop time for the network activity session. The time stamp may further be tied to a network activity level. Network activity level may indicate an amount of bandwidth used, amount of data uploaded or download, type of network activity (e.g., web browsing, electronic mail, video streaming or downloading, music streaming or downloading, name or type of application using the connection, ports used the connection, etc.). The data processing system 120 can store this information in a link data structure for the first computing device. In some implementations, the data processing system 120 can determine or identify this information responsive to a request for content item.

In some implementations, the matching engine 130 can identify or determine a type of computing device making the connection. The type of computing device may include, for example, mobile device, mobile telecommunications device, desktop computer, laptop computer, tablet, smartphone, electronic book reader, smartwatch, wearable computing device, gaming device, television set top box, digital media player, microconsole. The type of computing device may further indicate, for example, an operating system, available resources, device information, etc.

The data processing system 120 (e.g., via the matching engine 130) can compare the timestamps for the network activity associated with the first computing device 110a and the second computing device 110b to determine if the network activity overlaps. For example, the matching engine 130 can retrieve, from the link data structure in the data repository 145, start and stop times for network activity for the first computing device and the second computing device to determine whether the network activity sessions are overlapping. In some implementations, the matching engine 130 may determine, in real-time, whether network activity sessions of two computing devices using the same IP address or node to access the network 105 are overlapping. Real-time may refer to making the determination during the connection, during an overlapping portion of the connection, upon termination of one or both connections, or responsive to a request for content.

In some implementations, the matching engine 130 can determine a linking factor based on a geographic distance between two computing devices, where the two computing devices access the network via two different connections associated with two different IP addresses. For example, if two computing devices previously accessed the network via two connections that are associated with the same node 155 or IP address, with overlapping network activity, then the matching engine 130 may determine that the two computing devices have a first positive match probability. However, if one of those two computing devices was located in a different geographic location, then the matching engine 130 may determine a second positive match probability that is lower than the first positive match probability. This may be because the matching engine 130 determines that a single entity (e.g., a user) may not be using two computing devices that are located in different geographic locations at the same time.

The data processing system 120 can include a geographic location module 130 designed and constructed to receive geo-location data points associated with one or more computing device 110a-n. The data processing system can receive the data points via a computer network 105 via a TCP/IP protocol, cell phone data network, or another communication protocol of computer network 105. The data points can include location information and time information, or the data processing system 120 can determine the location or time information associated with a received data point upon receiving the data point from the user device 110. The data processing system 120 can also receive an identifier associated with the data point, such as a unique user device identifier, or a username associated with an application executing on the user device 110. In one implementation, an application executing on the user device 110 (e.g., a mobile application, a mobile operating system, a web browser, a map application, etc.) can transmit the geo-location data point that includes the location information. In one implementation, a mobile user device 110 may periodically ping the data processing system 120 or other intermediate system to provide location or time information. In one implementation, a smartphone or other cellular enabled user device 110 can ping a cell phone tower system, which may then provide location or time information to the data processing system 120.

The data processing system 120 can receive geo-location data points or pings in real time, or a predetermined time interval such as a periodic basis (e.g., 10 minutes, 5 minutes, 1 minute, 30 seconds, or another period that can facilitate the systems and methods disclosed herein). In another implementation, the data processing system 120 can receive the data points in a batch process that runs periodically where multiple geo-location data points associated with a user device 110 or multiple user devices 110 can be provided to the data processing system 120 in a single upload process. In one implementation, the user device 110 pushes the data points to the data processing system 120 in real-time, periodic basis, or in a batch process. In one implementation, the user device 110 that clicked on the content item is different than the user device 110 that provides the data points (e.g., a user may use a desktop or laptop computer to click on the content item, and use a mobile device or smart phone to provide data points). In another implementation, the user device 110 used to click on the content item is the same as the user device 110 used to generate, provide or transmit the data points.

The data points may include, or the data processing system 120 may determine, geographic location information of the geo-location data point based on, e.g., GPS, Wi-Fi, IP address, Bluetooth or cell tower triangulation techniques. In some implementations, the data processing system 120 may determine a latitude and longitude coordinate and identify a larger geographic area or cell comprising the latitude and longitude coordinate. The geographic location may correspond to a latitude or longitude coordinate, or the geographic location may correspond to a larger or smaller area, for example.

In some implementations, the received data points may include, or the data processing 120 may determine, geographic location information including, e.g., latitude and longitude coordinates, geographic information system ("GIS") information, country, state, city, county, town, or precinct. The data processing system 120 may receive or otherwise identify geographic location information associated with the user device 110 via an application programming interface ("API") that can provide scripted access to geographic location information associated with the user device 110. For example, the geographic API specification may include a specification associated with the World Wide Web Consortium ("W3C"). In one implementation, a user of a user device 110 proactively declares a location by checking-in to a location or otherwise declaring to an application executing on the user device 110 or to the data processing system that the user is at a location.

In some implementations, the geographic location of the user device 110 can be determined with appropriate end user consent via at least one of a global positioning system ("GPS"), cell tower triangulation, or Wi-Fi hotspots. For example, the data processing system 120 can identify or determine the technique used to determine a geographic location in order to determine an accuracy of the determined geo-location data point (e.g., GPS-based location information may be more accurate than IP-based location information). The data processing system 120 can also determine geographic location information based on a user's interaction with an information resource. In some implementations, the user device 110 may include a global positioning system ("GPS"). In some implementations the data processing system 120 may determine a geographic location based on an internet protocol ("IP") address. For example, the user device 110 may include a GPS sensor or antenna and be configured to determine a GPS location of the user device 110. The data processing system 120 can also determine the geographic location by using information obtained from one or more cell towers to triangulate the location of the user device 110. For example, the geographic location determined based on one information received from one cell tower, two cell towers or three cell towers may be sufficient for content selection. In some implementations, Wi-Fi hotpots may facilitate determining a geographic location because Wi-Fi hotspots may be stationary and can be used as a landmark. For example, the relation of a user device 110 with respect to a Wi-Fi hotspot can facilitate determining a geographic location of the user device 110.

The data processing system 120 (e.g., via matching engine 130) can determine a number of computing devices 110a-n that connect with the network 150 via the node 155 (e.g., via the first IP address) during a time period. The data processing system 120 can determine the number of computing devices 110a-n other than the first computing device 110a. For example, the first computing device 110a can be a mobile computing device 110a that facilitates determining the linking factor. The data processing system 120 can use the mobile computing device 110a as the single identifier for linked computing or reference for identifying the linking factor to facilitate determining a positive or negative matching factor.

The data processing system 120 can determine the single identifier for linked computing device or the reference mobile device using an anonymous identifier. The anonymous identifier can be unique to the mobile device. The data processing system 120 can determine or generate the anonymous identifier. For example, the data processing system 120 can generate the anonymous identifier based on information associated with the mobile device including, e.g., IP, operating system, application information, device information. The operating system can refer to a type of operating system. The application information can refer to a configuration of an application installed on the mobile device, the names of the applications installed on the mobile device, an identifier associated with one or more applications, usage patterns of the applications, etc. The anonymous or pseudo anonymous identifier can be numeric, alpha numeric, include characters, symbols, etc. For example, the data processing system can determine the IP address, operating system, and the top three most commonly used non-native applications to generate the identifier for the mobile device. The data processing system 120 can use this anonymous identifier (or pseudo anonymous identifier) of the first computing device as the identifier for the linked first computing device and second computing device. For example, the data processing system 120 can associate the identifier in the link data structure with the link between the two computing devices.

To determine the number of computing device connected with the network 105 using the same IP address or node 155 identifier, the data processing system 120 can perform a lookup in a data structure using the IP address or node 155 identifier. The result of the lookup may indicate the number of computing devices connected via the IP address. Since one of the devices can include the first computing device or the mobile device, the data processing system 120 can subtract the number one from the result of the lookup to determine the number of other computing devices connected to the network 105 via the IP address.

The data processing system 120 (e.g., via matching engine) can generate a positive match probability based on the first linking factor and based on the number of computing devices. The initial positive match probably may be set to a default positive match probability. The default positive match probability may be a value such as 0 or 1 or a percentage such as 0% or other default value that is predetermined (e.g., 100, 10, 50, etc.). The data processing system 120 can increase the default positive match probability or determine a new positive match probability. In some implementations, the data processing system 120 is configured to determine a positive match probability based on the formula: 100%/N, where N is the number of computing devices other than the first computing device identified by the data processing system at the first IP address during the first time period. The numerator in the formula may be a predetermined number or percentage or other value. In some cases, the numerator may include 50%, 75%, 25%, etc.

That matching engine 130 can increase the positive match probability based on various factors or linking factors. The data processing system 120 may monitor activity associated with computing devices to make determination regarding linking factors. For example, the data processing system 120 can identify activity from the first computing device that corresponds to a cessation of activity at the second computing device at a fourth time period. The fourth time period may be a different time period (e.g., overlapping or mutually exclusive) from a first, second, or third time period or a same time period. The data processing system 120 may monitor activity from the second computing device 110b and determine a cessation or termination or end of the activity (e.g., the second computing device 110b turns off, goes to standby mode, an application executing on the second computing device 110b is terminated, exited, or closed, a network card is turned off or disabled, access to the network 105 is lost, etc.). The data processing system 120 can determine the cessation responsive to no longer receiving network activity from the second computing device 110b or another indication of cessation of network activity (e.g., a request to log off or disable or terminate a connection).

Further, the data processing system 120 can monitor activity from the first computing device 110a to determine that initiation of activity from the first computing device 110a corresponds to activity from the second computing device 110b stopping. For example, the data processing system 110a can identify an activity from the first computing device 110a such as a request for a web page or other content via network 105. The data processing system 120 can determine that prior to this activity, the first computing device 110a was not active. For example, the data processing system 120 may not have received any activity from the computing device 110a for at least a time interval (e.g., 10 minutes, 5 minutes, 30 minutes, 1 hour, etc.). Thus, the data processing system 120 can identify initiation of activity from the first computing device 110a and identify a time stamp associated with such initiation, and compare this initiation time stamp with a cessation time stamp associated with the second computing device 110b to determine that the initiation of activity from the first computing device 110a corresponds to cessation of activity from the second computing device 110b. For example, the initiation can be concurrent with, is responsive to, sequential, overlapping, or within a time interval of the cessation.

The data processing system 120 can determine a negative match probability. The data processing system 120 can determine the negative match probability based on one or more linking factors. For example, the data processing system 120 may use the following linking factors to determine a negative match probability: input activity at the first computing device during a second time period, and based on input activity at the second computing device during the second time period; or activity at the first computing device via the first IP address during a third time period, and based on activity at the second computing device via a second IP address during the third time period. One or more of the first, second and third time periods may be different, overlap, or be the same.

Input activity may refer to a level of network activity or a type of network activity. Input activity can include high-level input activity or passive input activity. High-level activity can include active input activities such as playing a video game, typing a word document, using a computer aided design program, software programming etc. Passive activity can include, e.g., streaming music, streaming video, a screen saver, heartbeat or blood pressure sensor, ambient light sensor, GPS sensor, etc. It is unlikely that a user would perform a high-level activity on two computing devices simultaneously. For example, a user may not play a video game on two different computing devices simultaneously. Thus, a high-level activity on two computing devices may correspond to increasing a negative match probability. However, a user may listen to streaming music on one computing device while playing a video game on another computing device. Thus, passive activities such as streaming music or streaming a video or movie may not be high-level activity and may not increase a negative match probability.

For example, the data processing system 120 can determine a second linking factor different from the first linking factor. The second linking factor can be used to determine a negative match probability. The second linking factor can be based on a second time period that is different from the first time period (e.g., overlapping or mutually exclusive). The second linking factor can be based on the same first computing device 110a (e.g., the mobile device 110a) and the same second computing device 110b used to determine the first linking factor. In some implementations, the first linking factor and the second linking factor are based on the same two computing devices, and the first linking factor is based on a connection during a first time period and the second linking factor is based on an input activity during a second time period. The input activity associated with the first and second computing devices during the second time period may or may not be associated with the first IP address. The input activity associated with the first and second computing devices during the second time period may or may not be associated with the same IP address.

The data processing system 120 can monitor for an additional linking factor such as a third linking factor different from the first and second linking factor. The third linking factor can be based on the same first and second computing devices used to determine the first and second linking factors. The third linking factor can be based on a third time period. The third time period may be the same time period as the first time period for the first linking factor and the second time period for the second linking factor. The third time period can be different from the first or second time periods (e.g., overlapping or mutually exclusive). The third linking factor can be based on activity at the first and second computing devices during the time period. The third linking factor can be based on activity at the first and second computing devices during the time period where the activity of the first computing device is associated with a different IP address from the activity of the second computing device. For example, the activity of the first computing device can be associated with the first IP address, while the activity of the second computing device can be associated with a second IP address different from the first IP address.

Using the second and third linking factors, the data processing system 120 (e.g., via matching engine 130) can determine a negative match probability. The negative match probability may be initialized in the link data structure to a default negative match probability of, e.g., 0, 0%, 1, or some other default, predetermined value. The data processing system 120 can increase the negative match probability by an amount responsive to identifying a link factor indicative of a negative match. Link factors indicative of a negative match may include the second link factor and the third link factor.

The negative match probability may be increased by a fixed or predetermined amount. For example, each time the data processing system 120 identifies a link factor indicative of a negative link, the negative match probability may be increased by 10%, 25%, 30%, 50%, or some other amount or percentage that facilitates linked two or more devices to select content items. In some cases, the data processing system 120 can determine an amount to increase or decrease the negative match probability. For example, a linking factor (e.g., the third linking factor) can be based on a geographic distance between the first computing device and the second computing device based on the indication of input activity at the first computing device via the first IP address during the third time period, and based on the indication of input activity at the second computing device via the second IP address. The data processing system 120 can use the distance to determine the negative match probability. For example, if the distance between the mobile device and second computing device is more than a certain threshold, the data processing system 120 can add a negative link. Further, the data processing system 120 can determine the negative match probability as an exponential proportion to the distance and time. For example, if the distance is 1 mile and the duration between the first computing device activity request and second computing device activity is less than 1 minute, it is highly unlikely the two devices are being used by the same entity, and thus should not be linked. However, if the duration between the two activities is 30 minutes, it is possible they are used by the same entity, and thus can be linked. Thus, the higher the distance and shorter the time, the exponentially higher negative match probability.

That data processing system 120 can include a connector 135 designed and constructed to link two computing devices based on a positive match probability and a negative match probability. The data processing system 120 (e.g., via connector 135) can create a data structure (e.g., a link data structure in data repository 145) to indicate a link between the first computing device 110a and the second computing device 110b. The link may include a flag, binary value, pointer, alphanumeric value, anonymous identifier, or other association technique that indicates an association, link, of common anonymous or pseudo anonymous end user between two computing devices 110a-b.

The data processing system 120 can link the first and second computing devices and create the link in the data structure based on an overall match probability. The overall match probably can take into account the positive match probability and the negative match probability. For example, the data processing system 120 can determine the overall match probability by combining the positive match probability and the negative match probability. Combining may refer to adding them (e.g., if the positive match is a positive number and the negative match is a negative number) or subtracting them (e.g., if both positive and negative matches are positive values) or otherwise combining them using a formula. For example, the data processing system 120 can determine the overall match probability based on the difference between the positive match probability ("OP") and the negative match probability ("ON"). For example, the overall match probability=OP−ON or the overall match probability=ON−OP. The data processing system 120 can compare the overall probability with a threshold (e.g., 0%, 25%, 50%, etc.). When the overall match probability satisfies the threshold, then the data processing system 120 can link the two computing device. Satisfying a threshold can refer to the overall match probability being equal to or greater than the threshold. In some cases, satisfying the threshold can refer to the overall match probability being less than the threshold. For example, if OP=100%, ON=25%, and the threshold=25%, then the overall probability may be OP−ON=75% which is greater than the 25% threshold. Thus, the data processing system 120 can determine that the overall match probability satisfies the threshold, responsive to which the data processing system 120 can link the two computing devices and indicate the link in the link data structure.

The data processing system 120 can determine to link the first and second computing devices based on weighting factors. For example, the negative match probability and the positive match probability may have corresponding weights. The weights can be determined based on a machine learning model or regression analysis. For example, the data processing system 120 may perform an offline regression analysis to determine how adjusting the weights for the OP and ON affect the ability to predict whether two devices are actually used by the same entity.

The data processing system 120 can be configured with the following formulate to determine the overall match probability: $1/(1+e^{\wedge}-(wp*op+wn*on))$, where wp=weight for positive match probability, wn=weight for negative match probability, op=positive match probability, on=negative match probability. The weight can be a number greater than zero. The weight can be predetermined, set by an administrator of the data processing system 120, obtained from the link data structure, etc. The weight may be customized or tailored for the first computing device 110a. The data processing system 120 can calibrate the weight for positive match probability and the weight for negative match probability based on known links and known non-links. The data processing system 120 may store known links and non-links in the links data structure in data repository 145. The data processing system 120 can use this information to determine that a first wp and a first wn result in generating links that were false (e.g., non-links) or result in a low click through rate. The data processing system 120 may then adjust the weights and determine that fewer false links were generated or that a click through rate increased. If using historical data, the data processing system 120 can determine a predicted click through with the second weighting and compare the predicted click through rate using the adjusted weightings with an actual historical click through rate.

The data processing system 120 can generate vectors indicative of network activity information associated with a computing device. A vector of activities can be based on data points that can include an IP address, activity, and time of day. The vector of activities can be based on successive (e.g., sequential or chronological) data points that include IP address, activity, and time of day. For example, for each computing device, the data processing system 120 can generate a vector of activities that indicates a degree or level of activity of the computing device during different parts of the day. If two computing devices have similar activity signatures (e.g., level of activity or type of activity) during a time slot or time period, then it may be less likely that the two computing devices belong to the same user. The data processing system 120 can further generate a vector of locations to indicate where the computing devices are physically located during a time slot or time period. Based on the vector of locations, the data processing system 120 can determine that if a distance between two computing devices during a time slot or time period is greater than a distance threshold (e.g., 5 miles, 1 mile, 10 miles, 30 miles, etc.) then there is a low probability that the two computing devices belong to the same user, or that one of the computing devices is being shared by multiple users. Accordingly, based on a comparison between the first vector of activities associated with the first computing device and the second vector of activities associated with the second computing device, the data processing system 120 can adjust (e.g., increase or decrease) the positive match probability and the negative match probability.

The data processing system 120 can generate a non-link (or a null, void, or absence of a link, or remove a link, or an indication of not linked) between two computing devices based on linking factors during one or more time periods. The data processing system 120 may determine not to link two computing devices (or indicate a non-link between two computing devices) when both computing devices have a high degree of input activity during the same time period. The data processing system 120 may determine not to link two computing devices (or indicate a non-link between two computing devices) when both computing devices have a high degree of input activity during the same time period and they are the same type of input activity. The data processing system 120 may determine not to link two computing devices (or indicate a non-link between two computing devices) when both computing devices have a high degree of input activity during the same time period and they are separated by a distance greater than a distance threshold (e.g., 0.5 miles).

For example, the data processing system 120 can monitor for a fourth linking factor of a third computing device and a fourth computing device based on input activity at the third computing device during a fourth time period, and based on input activity at the fourth computing device during the fourth time period. For example, the data processing system 120 can determine there is a fourth linking factor when both the third and fourth computing devices have input activity or a degree of input activity greater than a threshold (e.g., number of requests for web pages or content; amount of bandwidth being used; amount of keyboard, mouse, touch, or voice input, etc.).

The data processing system 120 can then identify a change in IP addresses associated with activity of the two computing devices to identify a fifth linking factor. For example, the data processing system can monitor for a fifth linking factor of the third computing device and the fourth computing device based on activity at the third computing device via a third IP address during a fifth time period, and based on activity at the fourth computing device via a fourth IP address during the fifth time period. For example, the data processing system 120 can determine a level or degree of input activity greater than a threshold occurring via both the third and fourth computing devices. The data processing system 120 can further determine that the level or degree of input activity greater than the threshold occurring via both the third and fourth computing devices is associated with two different IP addresses. For example, the third and fourth computing devices may be at different geographic locations being used by different users.

Based on the fourth and fifth linking factors, the data processing system 120 can generate a second negative match probability. The data processing system 120 can generate a high second negative match probability because there is network activity occurring via both computing devices but from different locations. However, if network activity is only occurring via one of the devices, then the negative match probability may be lower. Similarly, if the network activity was occurring at both computing devices but via the same IP address (e.g., at the same location), then the negative match probability may be lower. The data processing system can determine a non-link between the third computing device and the fourth computing device based on the second negative match probability. The data processing system can create or modify the link data structure to indicate a non-link between the third computing device and the fourth computing device.

The data processing system 120 (e.g., via content selector 140) can select a content item for placement with an online document on the second computing device based on the link and based on computer network activity of the first computing device. For example, if the first computing device and the second computing device are linked, the data processing system 120 may use information (e.g., browsing history, network activity information) associated with the second computing device to display an advertisement on the first computing device responsive to a request for an advertisement from the first computing device.

Figure 2:
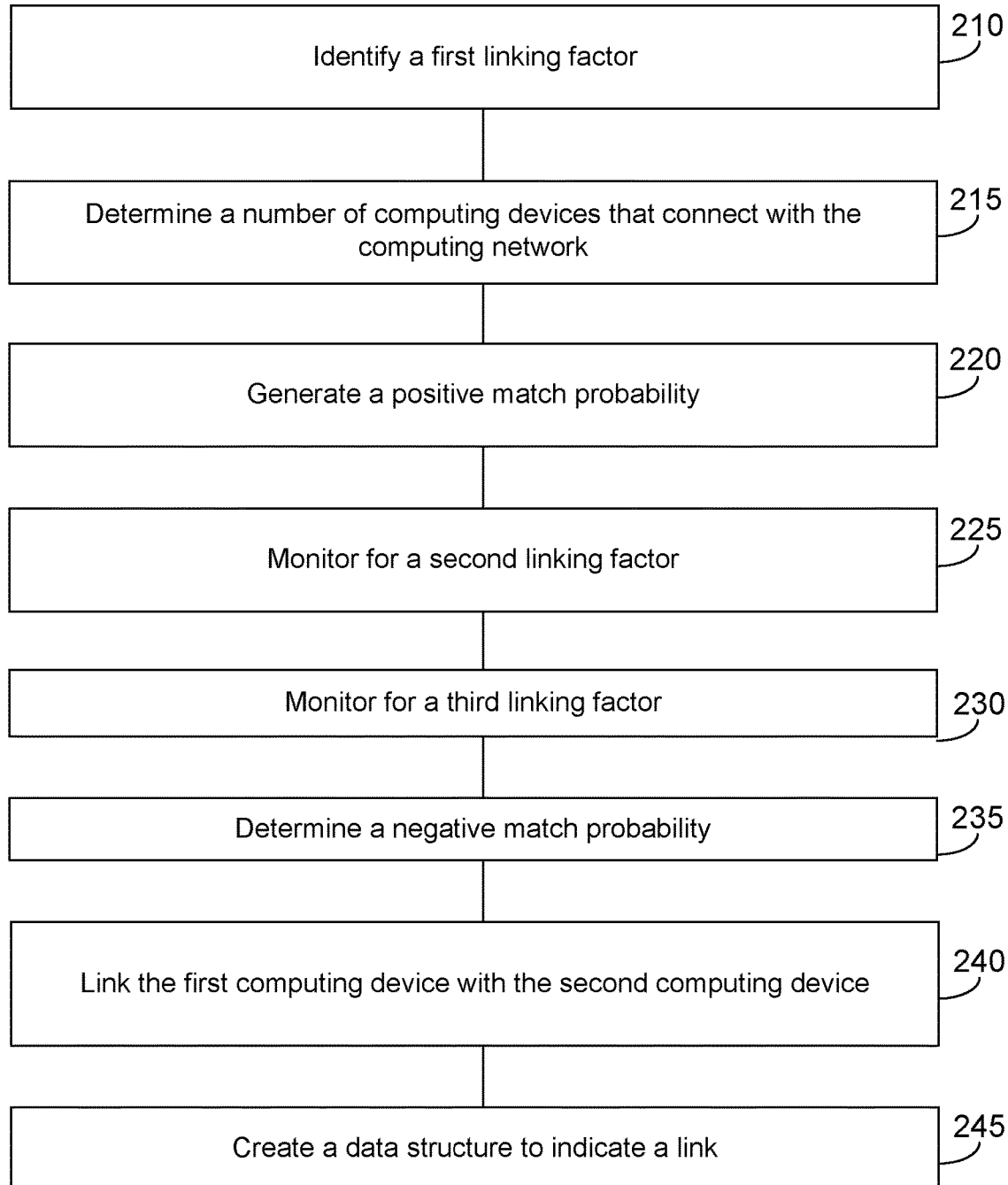
FIG. 2 depicts a method for selecting content based on linked computing devices via a computer network in accordance with an implementation.

FIG. 2 illustrates a method 200 for selecting content based on linked computing devices via a computer network in accordance with an implementation. The method 200 can facilitate associating computing devices with each other based on computer network activity. The method 200 can associate the computing devices together to provision or select content items as part of an online content item placement campaign. The method 200 can be performed by system 100, data processing system 120, computing device 400, or one or more component thereof. The method 200 can include a data processing system identifying a first linking factor at block 210. The data processing system can identify the first linking factor based on a connection between a first computing device and the computer network via a first IP address during a first time period, and based on a connection between a second computing device and the computer network via the first IP address during the first time period. The connection can include a network connection via a computer network. For example, the first and second computing devices can connect via a network to the data processing system. The computing devices can initiate or establish the connection. In some cases, the data processing system can initiate or establish the connection. The computing device can initiate the connection, or the connection may be established, responsive to a request for content or a web page for display on the computing device. The computing device may initiate the connection responsive to user interaction with the computing device, user input, an event, or condition. The user interaction may include user activity or input activity. User activity or input activity may include, e.g., activity sensed by a sensor of the computing device such as a GPS sensor, motion sensor, gyroscope, accelerometer, ambient light sensor, temperature sensor, sound sensor, blood pressure sensor, etc.

The data processing system can identify the first linking factor when a connection exists between the first computing device and the data processing system; the second computing device and the data processing system; and both connections are made via the same IP address or network node or gateway identifier (e.g., the same wireless or wired router, cable modem, bridge, network card, etc.).

The method 200 can include the data processing system determining a number of computing devices that connect with the computing network at block 215. The data processing system can determine a number of computing devices other than the first computing device that connect with the computer network via the first IP address during the first time period. For example, the data processing system can determine the number of computing devices that are connected to the computer network via the first IP address by counting the number of computing devices using the same IP address to connect. The data processing system can then determine that one of those computing devices is the first computing device. The first computing device can be a single identifier for linked computing devices or a reference device or linking device. The first computing device can be a mobile device. The first computing device can be associated with a unique identifier. The data processing system can generate the unique identifier for the first computing device. The data processing system can generate the unique identifier for the first computing device using characteristics, parameters or other information associated with the first computing device. The information may include, e.g., a device type (e.g., mobile device, tablet device, laptop, desktop, etc.), operating system (e.g., mobile operating system, desktop operating system, manufacturer or provider of the operating system, version of the operating system), device information (e.g., manufacturer of the device, hardware specification of the device, MAC address, etc.), application information (e.g., application associated with the network activity, application configuration, applications on the computing device), or other information associated with the computing device. Using a combination of these characteristics, the data processing system can generate a unique identifier, anonymous identifier, pseudonymous identifier for the computing device. Upon identifying the identifier of the computing device as corresponding to the first computing device, mobile device, single identifier, or reference/linking device, the data processing system can determine the number of devices connected via the IP address excluding the reference computing device.

The method 200 can include the data processing system generating a positive match probability at block 220. The positive match probability can have an initial or default value of 0%. The data processing system can generate the positive match probability based on the number of computing devices using the first IP address to connect, as determined at block 215. For example, the positive match probability can be 100%/N, where N is the number of computing devices other than the reference device determined at block 215. The data processing system can further adjust the positive match probability, up or down, based on linking factors.

The method 200 can include the data processing system monitoring for a second linking factor at block 225. The second linking factor can be based on input activity at a second time interval from the two computing devices from blocks 210, 215, and 220. The second time interval can overlap with the first time interval. The second time interval can be mutually exclusive from the first time interval. The second time interval can be the same as the first time interval. The input activity can include user input, input from sensors of the computing device, voice input, keyboard or mouse input, touchscreen input, motion input, gesture input, GPS sensor input, etc.

The data processing system can monitor for a second linking factor based on input activity at the first computing device during a second time period, and based on input activity at the second computing device during the second time period. The second linking factor can indicate a negative match probability, or two computing devices that are not suitable for linking, if the two computing devices each exhibit simultaneous high-level activity. High-level activity can include active input activities such as playing a video game, typing a word document, computer aided design programs, software programming etc. For example, a user may not play a video game on two different computing devices simultaneously. However, a user may listen to streaming music on one computing device while playing a video game on another computing device. Thus, passive activities such as streaming music or streaming a video or movie may not be high-level activity.

The method 200 can include the data processing system monitoring for a third linking factor at block 230. The third linking factor can be based on activity at the first computing device via the first IP address during a third time period, and based on activity at the second computing device via a second IP address during the third time period. The third linking factor can correspond to a negative match probability. For example, two computing devices not suitable for linking may each exhibit activity while separated by a large physical distance. Such a separation can be identified or determined from the respective IP addresses of the two computing devices. Accordingly, the data processing system can increase the negative match probability between those two computing devices upon identification of simultaneous activity from the two computing devices when they are separated by a distance threshold (e.g., 0.5 miles, 1 mile, 5 miles, 10 miles, 30 miles).

The method 200 can include the data processing system determining a negative match probability at block 235. The data processing system can determine the negative match probability based on the second linking factor and based on the third linking factor. For example, each time a second or third linking factor (as in blocks 225 and 230) are identified, then the data processing system can increase a negative match probability. The increase may be by a predetermined amount or computed based on information associated with the second and third linking factor. For example, with reference to the third linking factor, the larger the distance between the two IP addresses, the larger the increase in the negative match probability. This distance separation based increase may be proportional, exponentially proportional, additive, etc. The negative match probability may also be determined based on a rule or formula that may take into account a time period. For example, if the time interval between identifying the first linking factor and the third linking factor is small, and the distance between the two IP addresses in the third linking factor is large, then it is more likely that the two computing devices are being used by different users, thereby indicating a larger negative match probability.

The method 200 can include the data processing system linking the first computing device with the second computing device at block 240 and create a data structure in memory or a database to indicate a link at block 245. The system can combine the positive and negative match probabilities, and compare the overall probability with a probability threshold to determine whether to link the devices. The data processing system use the following formulate to determine the overall match probability: $1/(1+e^{-(wp*op+wn*on)})$, where wp=weight for positive match probability, wn=weight for negative match probability, op=positive match probability, on=negative match probability. Responsive to the overall match probability satisfying a threshold (e.g., equal to or greater than; or equal to or less then), then the data processing system can generate the link.

Figure 3A:
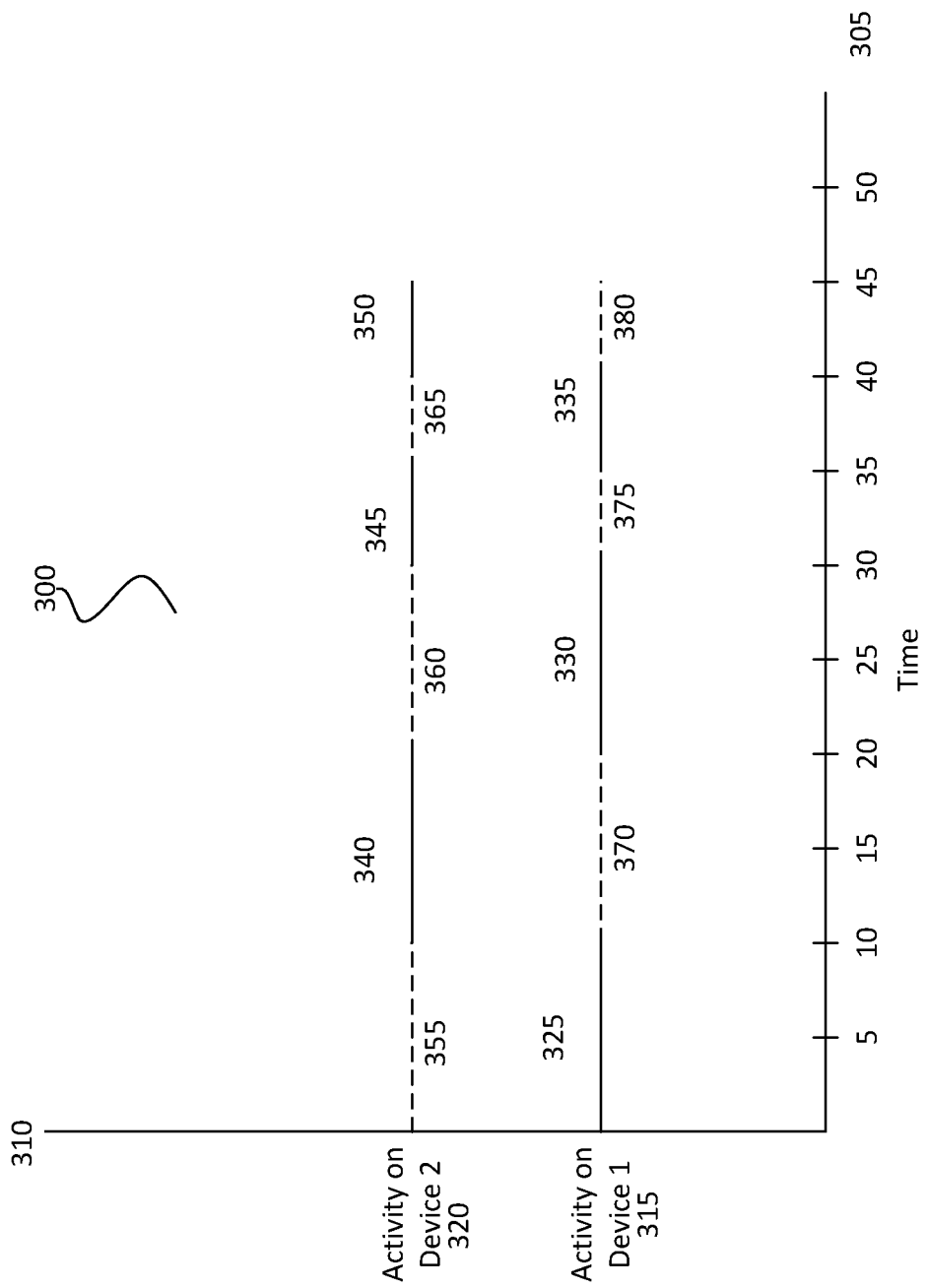
FIG. 3A is a diagram of computer network activity from multiple computing devices in accordance with an implementation.
Figure 3B:
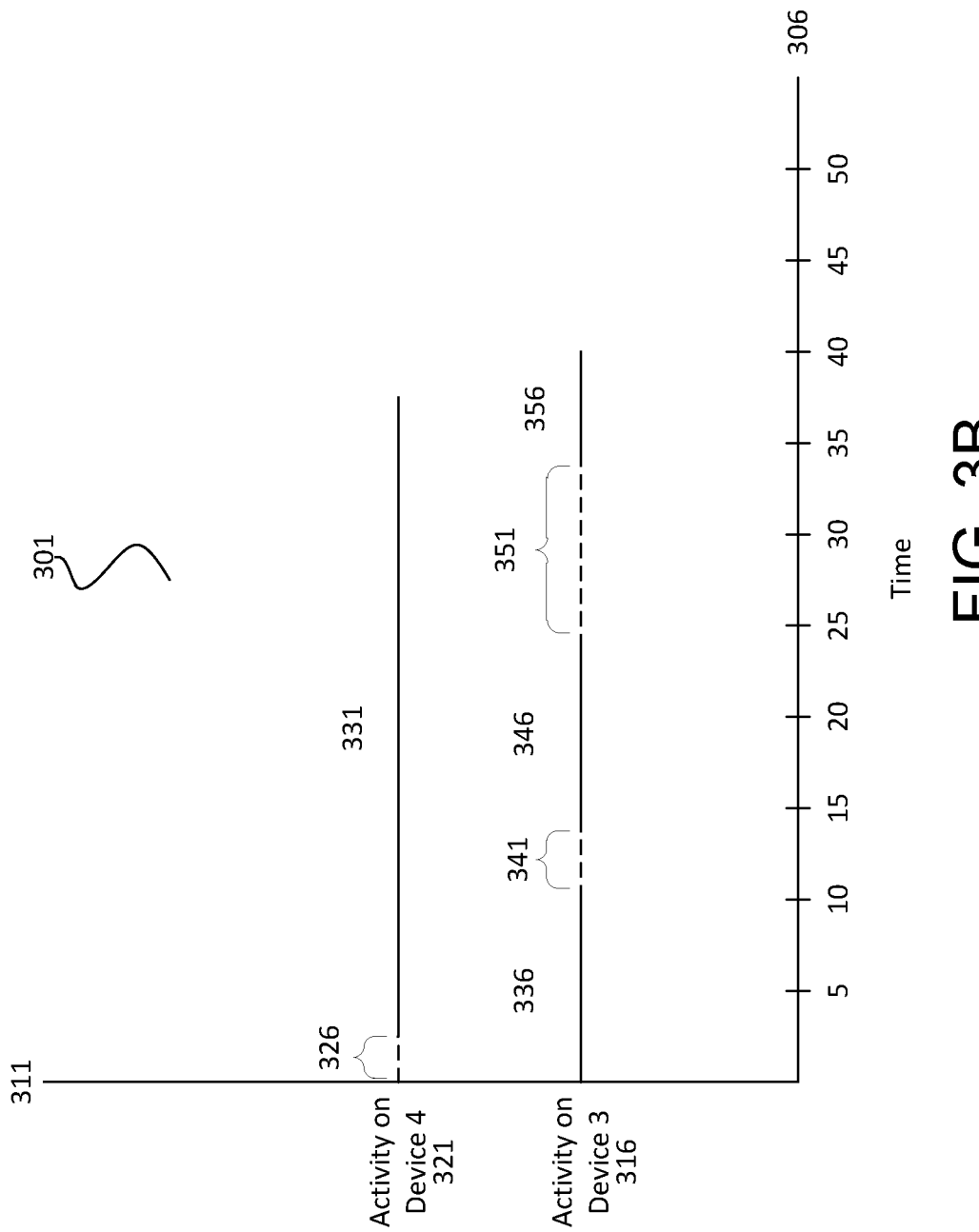
FIG. 3B is a diagram of computer network activity from multiple computing devices in accordance with an implementation.

FIGS. 3A and 3B are diagrams of computer network activity from multiple computing devices in accordance with one or more implementations. The data processing system can generate a graph for display based on the link data structure. The data processing system can use the first, second or third factors to generate the graph. The graph can illustrate or indicate links or matching probabilities. The graph 300 of FIG. 3A can indicate a linking factor for a positive match probability. The graph 300 includes a horizontal axis 305 for time and a vertical axis 310 for activity on a device. The time may be in minutes, seconds, hours or other unit of time. The axis 310 represents an activity on device 1 (315) and an activity on device 2 (320). Device 1 (315) can be a first computing device such as a single identifier device, reference device or linking device. Device 2 (320) can be a second computing device. The activity plotted on the graph 300 can indicate a level of activity such as high-level activity or passive (or no) activity. For example, the dashed lines 355, 360, 365, 370, 375 and 380 can refer to passive activity on devices 1 and 2, respectively. The solid lines 325, 330, 335, 340, 345 and 350 can represent high-level activity. As illustrated in graph 300, the high-level activity 325 of device 1 (315) corresponds to passive activity or no activity 355 on device 2 (320). This pattern persists throughout time 0 to 45. For example, high level activity 340 on device 2 corresponds to no or passive activity 370 on device 1; passive or no activity 360 on device 2 corresponds to high-level activity 330 on device 1; high level activity 345 on device 2 corresponds to passive or no activity 375 on device 1; passive or no activity 365 on device 2 corresponds to high-level activity 335 on device 1; and high level activity 350 on device 2 corresponds to passive or no activity 380 on device 1. Thus, this may trigger a positive linking factor (or not increase a negative match probability) because the two computing devices 315 and 320 do not have high-activity at the same time. Further, the two computing devices may be at same or different locations.

The graph 301 of FIG. 3B can indicate a linking factor for a negative match probability. The graph 301 includes a horizontal axis 306 for time and a vertical axis 311 for activity on a device. The time may be in minutes, seconds, hours or other unit of time. The axis 311 represents an activity on device 3 (316), and an activity on device 4 (321). Device 2 (316) can be a first computing device such as a single identifier device, reference device or linking device. Device 4 (321) can be a second computing device. The activity plotted on the graph 301 can indicate a level of activity such as high-level activity or passive (or no) activity. For example, the dashed lines 326, 341, and 351 can refer to passive activity on devices 3 and 4, respectively. The solid lines 331, 336, 346, and 356 can represent high-level activity. As illustrated in graph 301, the high-level activity 336 of device 1 (316) overlaps with both passive (or no) activity 326 and high-level activity 331 on device 4 (321). This may either not indicate a positive match, or may indicate a negative match. This pattern persists throughout time 0 to 40. For example, high-level activity 331 on device 4 (321) continues to overlap with both passive (or no) activity 341 and high-level activity 346 on device 3 (316); and high-level activity 331 on device 4 (321) continues to overlap with both passive (or no) activity 351 and high-level activity 356 on device 3 (316). Thus, this may trigger a negative linking factor (or not increase a positive match probability) because the two computing devices 316 and 321 have high-level activity (e.g., active input activity) at the same time. If the two computing devices 321 and 316 are at different locations, then this may further increase the negative match probability. The amount of distance between devices 321 and 316 can further increase the negative match probability. For example, if the two devices are a 5 miles apart, but both exhibit high activity levels simultaneously, then it is not possible for the same user to be using both devices, thereby indicating a non-link.

Figure 4:
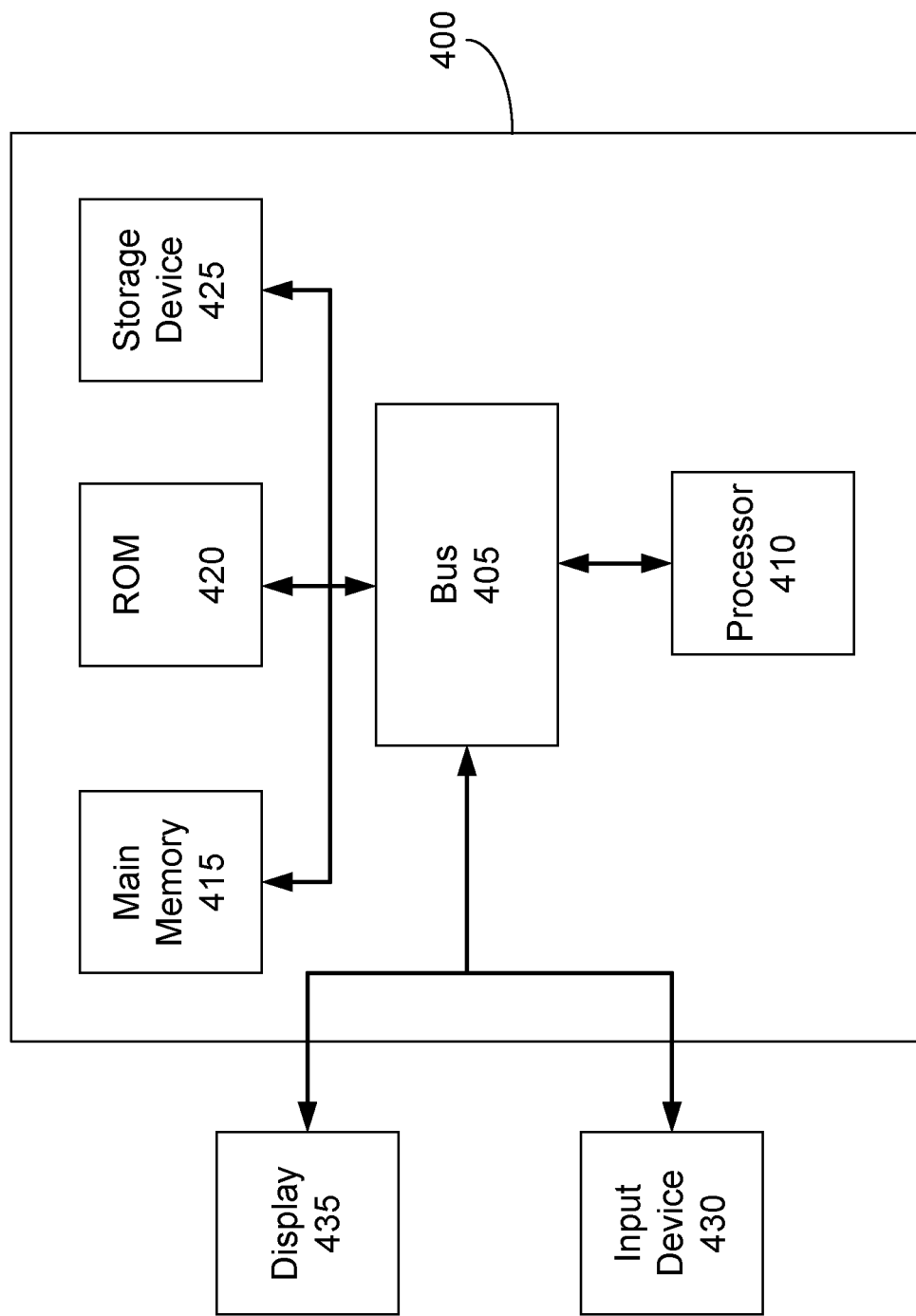
FIG. 4 is a block diagram illustrating a general architecture for a computer system that may be employed to implement various elements of the system shown in FIG. 1 and the method shown in FIG. 2, among others, in accordance with an implementation.

FIG. 4 is a block diagram of a computer system 400 in accordance with an illustrative implementation. The computer system or computing device 400 can be used to implement the system 100, system 300, content provider 125, computing device 110, content publisher 115, data processing system 120, matching engine 130, connector 135, content selector 140, geographic location module 150, and data repository 145. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to associate computing devices with each other based on computer network activity, comprising:
a data processing system having a matching engine and a connector executed by one or more processors, the data processing system configured to:
identify a first linking factor based on a connection between a first computing device and the computer network at a first location in a first time period, and based on a connection between a second computing device and the computer network at the first location in the first time period;
determine a number of computing devices other than the first computing device that connect with the computer network at the first location during the first time period;
generate a positive match probability based on the first linking factor and based on the number of computing devices;
monitor for a second linking factor based on input activity at the first computing device in a second time period, and based on input activity at the second computing device in the second time period;
monitor for a third linking factor based on activity at the first computing device at the first location during a third time period, and based on activity at the second computing device at a second location in the third time period;
determine a negative match probability based on the second linking factor and based on the third linking factor;
link the first computing device with the second computing device based on the positive match probability and the negative match probability; and create a data structure to indicate a link between the first computing device and the second computing device.

2. The system of claim 1, wherein the data processing system further comprises a geographic locator, and the data processing system is further configured to:
receive geo-location data points from the first computing device to determine the first computing device is at the first location; and
receive geo-location data points from the second computing device to determine the second computing device is at the first location.

3. The system of claim 1, wherein the data processing system further comprises a geographic locator, and the data processing system is further configured to:
receive geo-location data points from the first computing device, the geo-location data points comprising at least one of Global Positioning System information, Wi-Fi information, an IP address, Bluetooth information or cell tower triangulation information.

4. The system of claim 1, wherein the data processing system is further configured to:
increase the positive match probability based on an identification, by the data processing system, of activity from the first computing device corresponding to a cessation of activity at the second computing device at a fourth time period.

5. The system of claim 1, wherein the data processing system is further configured to:
increase the positive match probability based on a number of computing devices other than the first computing device identified by the data processing system at the first location during the first time period.

6. The system of claim 1, wherein the data processing system is further configured to:
link the first computing device with the second computing device based on an overall match probability based on a weight for positive match probability, a weight for negative match probability, the positive match probability, and the negative match probability.

7. The system of claim 6, wherein the data processing system is further configured to:
calibrate the weight for positive match probability and the weight for negative match probability based on known links and known non-links.

8. The system of claim 1, wherein the data processing system is further configured to:
generate a first vector of activities for the first computing device based on successive data points that indicate the first location, activity, and time of day;
generate a second vector of activities for the second computing device based on successive data points that indicate the first location, activity, and time of day;
adjust the positive match probability and the negative match probability based on a comparison between the first vector and the second vector.

9. The system of claim 1, wherein an anonymous identifier of the first computing device is used as the identifier for the linked first computing device and second computing device.

10. The system of claim 1, wherein the data processing system is further configured to:
monitor for a fourth linking factor of a third computing device and a fourth computing device based on input activity at the third computing device in a fourth time period, and based on input activity at the fourth computing device during the fourth time period;
monitor for a fifth linking factor of the third computing device and the fourth computing device based on activity at the third computing device at a third location in a fifth time period, and based on activity at the fourth computing device at a fourth location during the fifth time period;
generate a second negative match probability based on the fourth linking factor of the third computing device and the fourth computing device and based on the fifth linking factor of the third computing device and the fourth computing device;
determine a non-link between the third computing device and the fourth computing device based on the second negative match probability; and
modify the data structure to indicate a non-link between the third computing device and the fourth computing device.

11. The system of claim 1, wherein the data processing system is further configured to:
select a content item for placement with an online document on the second computing device based on the link and based on computer network activity of the first computing device.

12. The system of claim 1, wherein the third linking factor is based on a geographic distance between the first computing device and the second computing device based on the input activity at the first computing device at the first location during the third time period, and based on the input activity at the second computing device at the second location.

13. A method of associating computing devices with each other based on computer network activity, comprising:
identifying, by a data processing system having a matching engine and a connector executed by one or more processors, a first linking factor based on a connection between a first computing device and the computer network at a first location during a first time period, and based on a connection between a second computing device and the computer network at the first location during the first time period;
determining, by the data processing system, a number of computing devices other than the first computing device that connect with the computer network at the first location during the first time period;
generating, by the data processing system, a positive match probability based on the first linking factor and based on the number of computing devices;
monitoring, by the data processing system, for a second linking factor based on input activity at the first computing device during a second time period, and based on input activity at the second computing device during the second time period;
monitoring, by the data processing system, for a third linking factor based on activity at the first computing device at the first location during a third time period, and based on activity at the second computing device at a second location during the third time period;
determining, by the data processing system, a negative match probability based on the second linking factor and based on the third linking factor;
linking, by the data processing system, the first computing device with the second computing device based on the positive match probability and the negative match probability; and
creating, by the data processing system, a data structure to indicate a link between the first computing device and the second computing device.

14. The method of claim 13, further comprising:
receiving geo-location data points from the first computing device to determine the first computing device is at the first location; and
receiving geo-location data points from the second computing device to determine the second computing device is at the first location.

15. The method of claim 13, further comprising:
receiving geo-location data points from the first computing device, the geo-location data points comprising at least one of Global Positioning System information, Wi-Fi information, an IP address, Bluetooth information or cell tower triangulation information.

16. The method of claim 13, further comprising:
increasing the positive match probability based on an identification, by the data processing system, of activity from the first computing device corresponding to a cessation of activity at the second computing device at a fourth time period.

17. The method of claim 13, further comprising:
increasing the positive match probability based on a number of computing devices other than the first computing device identified by the data processing system at the first location during the first time period.

18. The method of claim 13, further comprising:
linking the first computing device with the second computing device based on an overall match probability based on a weight for positive match probability, a weight for negative match probability, the positive match probability, and the negative match probability.

19. The method of claim 13, further comprising:
generating a first vector of activities for the first computing device based on successive data points indicating the first location, activity, and time of day;
generating a second vector of activities for the second computing device based on successive data points indicating the first location, activity, and time of day;
adjusting the positive match probability and the negative match probability based on a comparison between the first vector and the second vector.

20. The method of claim 13, further comprising:
monitoring for a fourth linking factor of a third computing device and a fourth computing device based on input activity at the third computing device during a fourth time period, and based on input activity at the fourth computing device during the fourth time period;
monitoring for a fifth linking factor of the third computing device and the fourth computing device based on activity at the third computing device at a third location during a fifth time period, and based on activity at the fourth computing device at a fourth location during the fifth time period;
generating a second negative match probability based on the fourth linking factor of the third computing device and the fourth computing device and based on the fifth linking factor of the third computing device and the fourth computing device;
determining a non-link between the third computing device and the fourth computing device based on the second negative match probability; and
modifying the data structure to indicate a non-link between the third computing device and the fourth computing device.

* * * * *